United States Patent
Yamasaki

(10) Patent No.: US 10,291,155 B2
(45) Date of Patent: May 14, 2019

(54) VIBRATION WAVE MOTOR

(71) Applicant: CANON KABUSHIKI KAISHA, Tokyo (JP)

(72) Inventor: Ryo Yamasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 489 days.

(21) Appl. No.: 15/094,500

(22) Filed: Apr. 8, 2016

(65) Prior Publication Data

US 2016/0301329 A1  Oct. 13, 2016

(30) Foreign Application Priority Data

Apr. 10, 2015 (JP) .................................. 2015-080688

(51) Int. Cl.
*H01L 41/09* (2006.01)
*H02N 2/02* (2006.01)
*H02N 2/00* (2006.01)

(52) U.S. Cl.
CPC ........... *H02N 2/026* (2013.01); *H02N 2/0065* (2013.01)

(58) Field of Classification Search
CPC ............................... H02N 2/06; H02N 2/0065
USPC ............ 310/323.01, 323.02, 323.09, 323.11, 310/323.13, 323.15, 323.17, 328
See application file for complete search history.

(56) References Cited

U.S. PATENT DOCUMENTS

| | | | | |
|---|---|---|---|---|
| 4,495,432 A | * | 1/1985 | Katsuma | H02N 2/163 310/321 |
| 5,245,243 A | * | 9/1993 | Ohnishi | H02N 2/106 310/323.15 |
| 6,154,590 A | * | 11/2000 | Jin | G02B 6/022 359/337.21 |

(Continued)

FOREIGN PATENT DOCUMENTS

| | | |
|---|---|---|
| CN | 1597145 A | 3/2005 |
| CN | 102969936 A | 3/2013 |

(Continued)

OTHER PUBLICATIONS

The above patent documents were cited in a Feb. 7, 2018 Chinese Office Action, which is enclosed with an English Translation, that issued in Chinese Patent Application No. 201610212944.4.

(Continued)

*Primary Examiner* — Thomas M Dougherty
(74) *Attorney, Agent, or Firm* — Cowan, Liebowitz & Latman, P.C.

(57) ABSTRACT

A thin vibration wave motor is provided by thinning a friction member of the vibration wave motor. In a vibration wave motor including: a vibrator including a piezoelectric element and a vibration plate; and a friction member including a frictional contact surface to be brought into contact with the vibrator, the vibrator and the friction member being moved relative to each other using vibration generated in the vibrator, the vibration plate includes a flat plate portion to which the piezoelectric element is fixed and projection portions to be brought into contact with the friction member, and the friction member includes at least one reinforcing portion that increases a strength of the friction member along a direction of the relative movement, in a region between the flat plate portion and the friction member.

11 Claims, 4 Drawing Sheets

(56) References Cited

U.S. PATENT DOCUMENTS

| | | | | |
|---|---|---|---|---|
| 7,015,623 B2* | 3/2006 | Nitto | ........................ | H02N 2/16 |
| | | | | 310/323.01 |
| 8,297,149 B2* | 10/2012 | Tochimoto | .......... | H01L 41/0906 |
| | | | | 271/267 |
| 2009/0152988 A1 | 6/2009 | Sakamoto | | |
| 2014/0285066 A1* | 9/2014 | Yamamoto | ............. | H02N 2/026 |
| | | | | 310/323.02 |
| 2014/0293463 A1* | 10/2014 | Yamanaka | ............. | H02N 2/026 |
| | | | | 359/824 |

FOREIGN PATENT DOCUMENTS

| | | |
|---|---|---|
| CN | 1543049 A | 11/2014 |
| EP | 1453116 A2 | 9/2004 |
| JP | 2006-074972 A | 3/2006 |
| JP | 2007-028828 A | 2/2007 |
| JP | 2014-183724 A | 9/2014 |
| JP | 2015-047036 A | 3/2015 |
| TW | 200631298 A | 9/2006 |

OTHER PUBLICATIONS

The above foreign patent documents were cited in the Jan. 31, 2019 Japanese Office Action, a copy of which is enclosed without an English Translation, that issued in Japanese Patent Application No. 2015080688.

* cited by examiner

VIBRATION WAVE MOTOR

BACKGROUND OF THE INVENTION

Field of the Invention

The present invention relates to a vibration wave motor to be employed in, e.g., an optical device.

Description of the Related Art

Conventionally, ultrasonic motors are known as a technique in which a vibrator that vibrates periodically is pressed against and thereby brought into fictional contact with a friction member to move the vibrator and the friction member relative to each other. There is an example of making this type of ultrasonic motor into a linear ultrasonic motor for use in linear focusing driving of a taking lens. Japanese Patent Application Laid-Open No. 2014-183724 discloses a configuration in which a quadrangular prism-shaped friction member is arranged and a vibrator movably arranged on the friction member elliptically vibrates at an ultrasonic frequency, enabling linear driving. In this configuration, the vibrator is arranged on the friction member and a pressure mechanism for frictional contact of the vibrator is further laid on an upper portion of the friction member, resulting in increase in size of the ultrasonic motor.

In order to make an ultrasonic motor having such conventional configuration thinner, thinning of a friction member has been proposed; however, simple thinning of a friction member causes increase in number of vibration resonance points and thus frictional contact deterioration due to unwanted vibration, resulting in degradation in driving performance of the ultrasonic motor. Therefore, the friction member needs to have a certain degree of dimension in a thickness direction, which hinders thinning of the ultrasonic motor.

SUMMARY OF THE INVENTION

Therefore, the present invention has been made in view of the aforementioned problem, and an object of the present invention is to provide a vibration wave motor (ultrasonic motor) that can be thinned without decrease in driving performance.

In order to achieve the above object, a vibration wave motor according to the present invention includes: a vibrator including a piezoelectric element and a vibration plate; and a friction member including a frictional contact surface to be brought into contact with the vibrator, the vibrator and the friction member being moved relative to each other using vibration generated in the vibrator, and the vibration plate includes a flat plate portion to which the piezoelectric element is fixed and a projection portion to be brought into contact with the friction member, the friction member including at least one reinforcing portion that increases a strength of the friction member along a direction of the relative movement, in a region between the flat plate portion and the friction member.

The present invention enables provision of a vibration wave motor that can be thinned without decrease in driving performance.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Exemplary Embodiment 1

Figure 1:
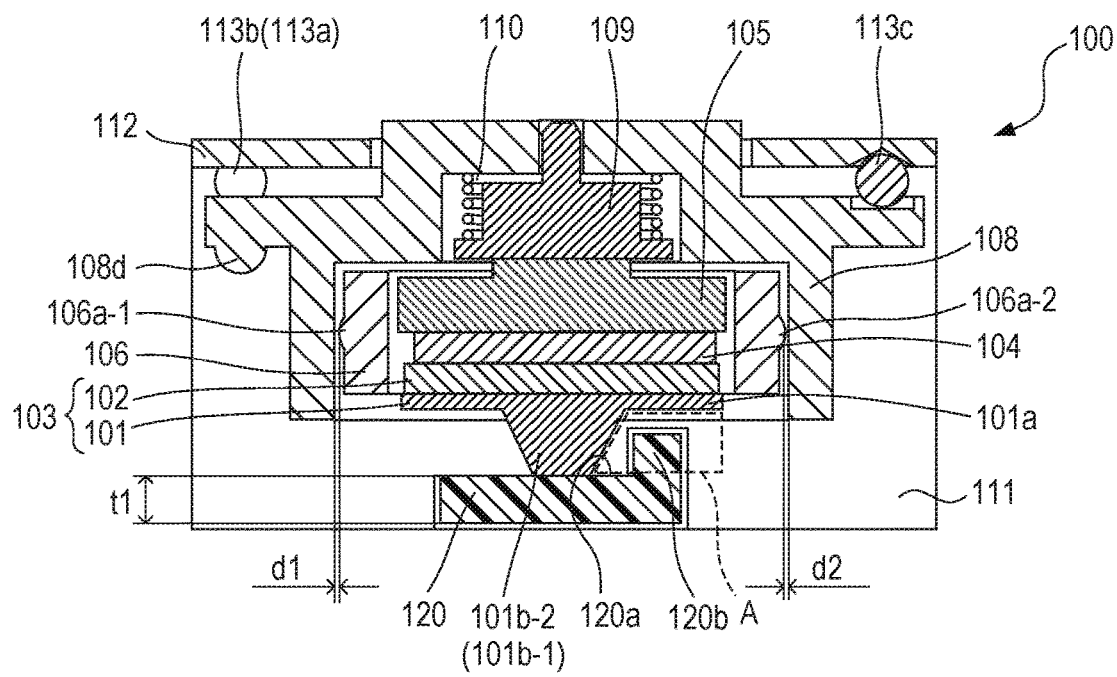
FIG. 1 is a cross-sectional view of a vibration wave motor 100 according to Exemplary Embodiment 1 in FIG. 4.
Figure 2:
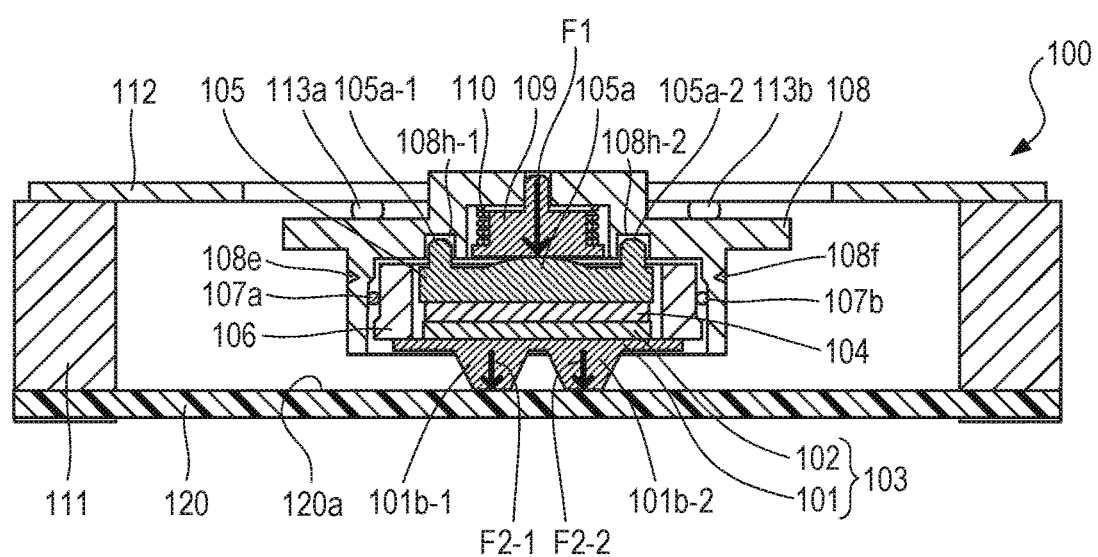
FIG. 2 is a cross-sectional view of the vibration wave motor 100 according to Exemplary Embodiment 1 in FIG. 4.

In the drawings illustrating the present invention, an X-Y-Z coordinate system is defined as indicated in the respective drawings. FIG. 1 is a cross-sectional view of a vibration wave motor 100 (ultrasonic motor) according to Exemplary Embodiment 1 along cross-section line I-I in FIG. 4. FIG. 2 is a cross-sectional view of the vibration wave motor 100 according to Exemplary Embodiment 1 along cross-section line II-II in FIG. 4. A structure of the vibration wave motor 100 will be described with reference to the drawings.

In FIGS. 1 and 2, a vibration plate 101 and a piezoelectric element 102 included in the vibration wave motor 100 are bonded to each other via, e.g., an adhesive. A vibrator 103 is formed by the vibration plate 101 and the piezoelectric element 102. The vibration plate 101 includes a flat plate portion 101a and two projection portions 101b-1 and 101b-2. Although two projection portions are formed alongside in the vibration plate 101, the number of projection portions may be one or more.

Figure 3:
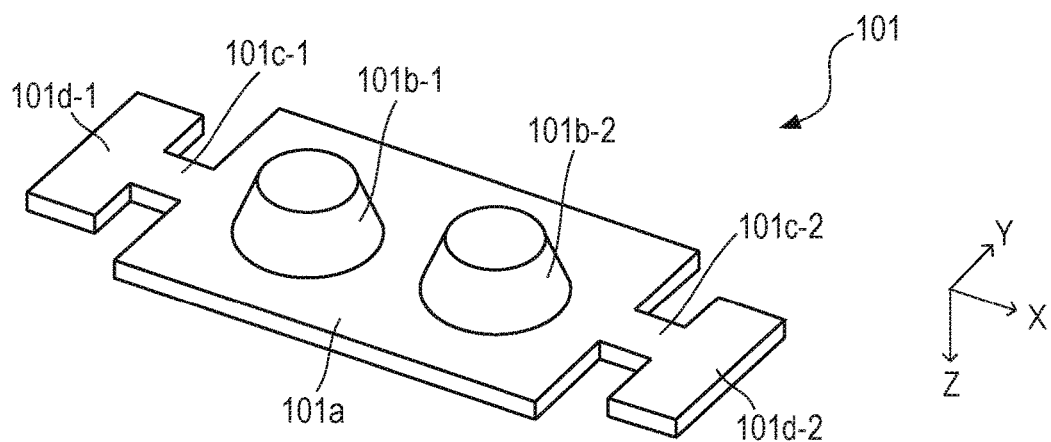
FIG. 3 is a perspective view of a vibration plate 101 in Exemplary Embodiment 1.

FIG. 3 is a perspective view of the vibration plate 101 from the projection portion 101b-1 and 101b-2 side. The vibration plate 101 includes a rectangular flat plate portion 101a at a center, and the truncated cone or column-shaped projection portions 101b-1 and 101b-2 are provided at the flat plate portion 101a. At a top portion of each of the projection portions 101b-1 and 101b-2, a flat portion is provided, and the flat portions are brought into contact with a frictional contact surface 120a of a later-described traction member 120. Holding portions 101d-1 and 101d-2 for fixing the vibration plate 101 to a later-described vibrator holding member 106 are provided on respective sides opposite to each other in a longitudinal direction of the vibration plate 101. The holding portions 101d-1 and 101d-2 are joined to the flat plate portion 101a via respective arm portions 101c-1 and 101c-2.

The piezoelectric element 102 is fixed to a surface of the flat plate portion 101a, the surface being on the opposite side of a surface on which the projection portions 101b-1 and 101b-2 are provided, and upon a drive signal being given to the piezoelectric element 102, elliptic vibration (ultrasonic vibration) occurs in the projection portions 101b-1 and 101b-2. Then, the projection portions 101b-1 and 101b-2 are brought into fictional contact with the later-described friction member 120, enabling generation of a driving force.

In FIG. 2, the holding portions 101*d*-1 and 101*d*-2 of the vibration plate 101 are fixed to a bottom portion of the vibrator holding member 106 so that the projection portions 101*b*-1 and 101*b*-2 face downward in a Z-axis direction. In such a manner as described above, the entire vibrator 103 is held by the vibrator holding member 106. The friction member 120 includes a frictional contact surface 120*a* to be brought into frictional contact with the two projection portions 101*b*-1 and 101*b*-2 of the vibration plate 101. The friction member 120 is formed via resin molding using a resin material, and the frictional contact surface 120*a* is DLC (diamond-like carbon)-coated. Also, the friction member 120 may be formed by a metal material, and in this case, a hard layer may be formed on a surface of the friction member 120 via surface treatment or thermal treatment rather than coating with, e.g., DLC. Furthermore, the friction member 120 may be formed by ceramic, and in this case, a high hardness can be obtained with no special processing required, and thus, it is sufficient only to adjust a roughness of a surface to a desired roughness.

A buffer member 104 is arranged on the upper surface side of the piezoelectric element 102 in the Z-axis direction. The buffer member 104 prevents vibration generated in the vibrator 103 from being transmitted to a member provided on an upper portion of the buffer member 104. A pressure transmission member 105 is arranged on the upper portion of the buffer member 104.

A pressurizing means includes a pressurizing means 109 and a spring member 110. The pressurizing means generates a pressure F1 for pressing the vibrator 103 against the friction member 120.

Figure 4:
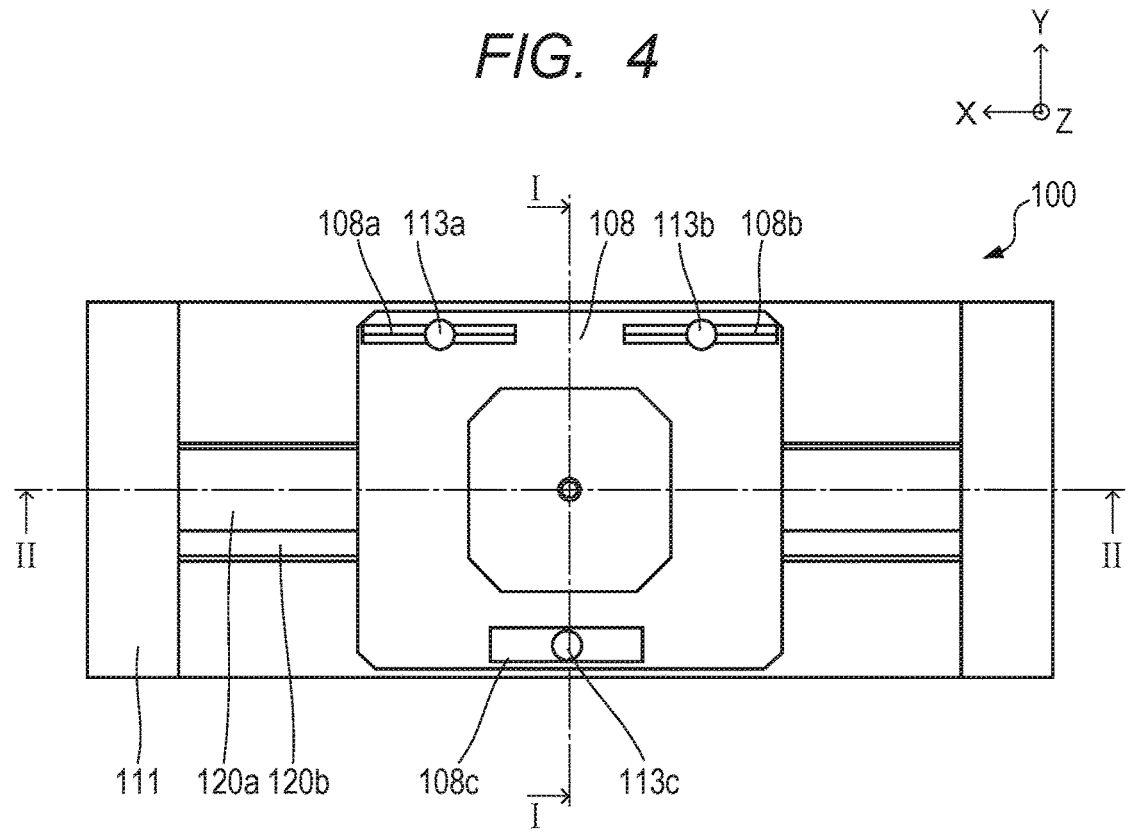
FIG. 4 is a plan view of the vibration wave motor 100 according to Exemplary Embodiment 1.

In FIG. 1, a moving member 108 moves in an X-axis direction while holding all the members other than the friction member 120 from among the aforementioned members. The moving member 108 includes a semispherical projection portion 108*d*, and another member engages with the projection portion 108*d* (not illustrated), enabling extraction of a driving force of the vibration wave motor 100. Also, as illustrated in FIG. 4, the moving member 108 includes three guide portions 108*a*, 108*b* and 108*c* for guiding movement. FIG. 4 is a plan view of the vibration wave motor 100 in FIGS. 1 and 2 from the Z-axis side, and for ease of understanding of the structure, a cover plate 112, which is illustrated in FIGS. 1 and 2, is not illustrated.

In FIG. 4, a housing member 111 holds the friction member 120 and the cover plate 112. Here, the friction member 120 and the cover plate 112 are fixed to the housing member 111 via, e.g., screws. Rolling members 113*a*, 113*b* and 113*c* engage with the respective guide portions 108*a*, 108*b* and 108*c* and non-illustrated respective guide portions of the cover plate 112 arranged above the upper portions of the guide portions 108*a*, 108*b* and 108*c*. The moving member 108 is guided by the cover plate 112 via the rolling members 113*a*, 113*b* and 113*c* so as to be movable in the X-axis direction.

In FIG. 2, the pressurizing means 109 is arranged so as to be displaceable in the Z-axis direction relative to the moving member 108, and gives a pressure F1 (arrow in FIG. 2) generated by a spring force of the spring member 110 to the pressure transmission member 105. A columnar projection portion 105*a* provided in the vicinity of a center portion of the pressure transmission member 105 is in abutment with the pressurizing means 109, and as illustrated in FIG. 2, shaft portions 105*a*-1 and 105*a*-2 provided at opposite end portions engage with respective hole portions 108*h*-1 and 108*h*-2 of the moving member 108. Here, while in the cross-sectional view (as viewed in a Y-axis direction) in FIG. 2, the shaft portion 105*a*-1 and the shaft portion 105*a*-2 engage with the hole portion 108*h*-1 and the hole portion 108*h*-2, respectively, with respective gaps therebetween, in the cross-sectional view (view in the X-axis direction) in FIG. 1, the shaft portion 105*a*-1 and the shaft portion 105*a*-2 are fitted in the hole portion 108*h*-1 and the hole portion 108*h*-2, respectively, with no respective gaps therebetween (not illustrated). In other words, the pressure transmission member 105 is loosely fitted in the moving member 108. Therefore, the pressure transmission member 105 is held so as to be tiltable about a certain axis in the Y-axis direction relative to the moving member 108.

The pressure F1 exerted on the pressure transmission member 105 is transmitted in the form of respective divisional pressures F2-1 and F2-2 to the two projection portions 101*b*-1 and 101*b*-2 of the vibration plate 101 via the buffer member 104 and the piezoelectric element 102. Here, the divisional pressures F2-1 and F2-2 have magnitudes equal to each other, and a force that is a total of these pressures the pressure F1. The divisional pressures F2-1 and F2-2 can bring the projection portions 101*b*-1 and 101*b*-2 into contact with the friction member 120.

In FIG. 1, the vibrator holding member 106 includes curved projection portions 106*a*-1 and 106*a*-2 at an outer side surface portion thereof, and there are respective small gaps d1 and d2 between the moving member 108 and the projection portions 106*a*-1 and 106*a*-2 in the Y-axis direction. In FIG. 2, the vibrator holding member 106 is held by the moving member 108 via roller members 107*a* and 107*b* between the outer side surface portion and an inner side surface portion of the moving member 108. In the outer side surface portion of the moving member 108, groove portions 108*e* and 108*f* are provided, and the groove portions 108*e* and 108*f* can easily elastically deform when assembling the vibrator holding member 106 to the moving member 108.

The elastic deformation brings the vibrator holding member 106 and the roller members 107*a* and 107*b* into a state an which the vibrator holding member 106 and the roller members 107*a* and 107*b* are charged in the moving member 108 with a predetermined force in the X-axis direction. In other words, in the assembling, the vibrator holding member 106 and the roller members 107*a* and 107*b* are weakly pressed into the moving member 108, which causes the vibrator holding member 106 to be fitted in the moving member 108 via the roller members 107*a* and 107*b*. Therefore, while the vibrator holding member 106 and the moving member 108 can move in the X-axis direction integrally with no backlash, the vibrator holding member 106 is held so as to be displaceable in the Z-axis direction. This configuration enables the pressure transmission member 105 to be tilted about the certain axis in the Y-axis direction as mentioned above.

Therefore, even if the cover plate 112 and/or the friction member 120 are inclined because of, e.g., a manufacturing error, a favorable state of contact between the vibrator 103 and the friction member 120 can be maintained by the pressure transmission member 105 being tilted. Also, even if the frictional contact surface 120*a* of the friction member 120 has a poor flatness, a favorable contact state can be maintained in such a manner as mentioned above.

The vibration wave motor 100 according to the present invention is configured as described above, and elliptic vibration generated in the vibrator 103 causes the vibrator 103 and the friction member 120 to move relative to each other in the X-axis direction, providing the vibration wave motor 100 that is linearly driven. In the present invention, some ingenuity is made in the configuration of the friction member 120, enabling reduction in dimension in the Z-axis direction of the friction member 120.

Figure 5A:
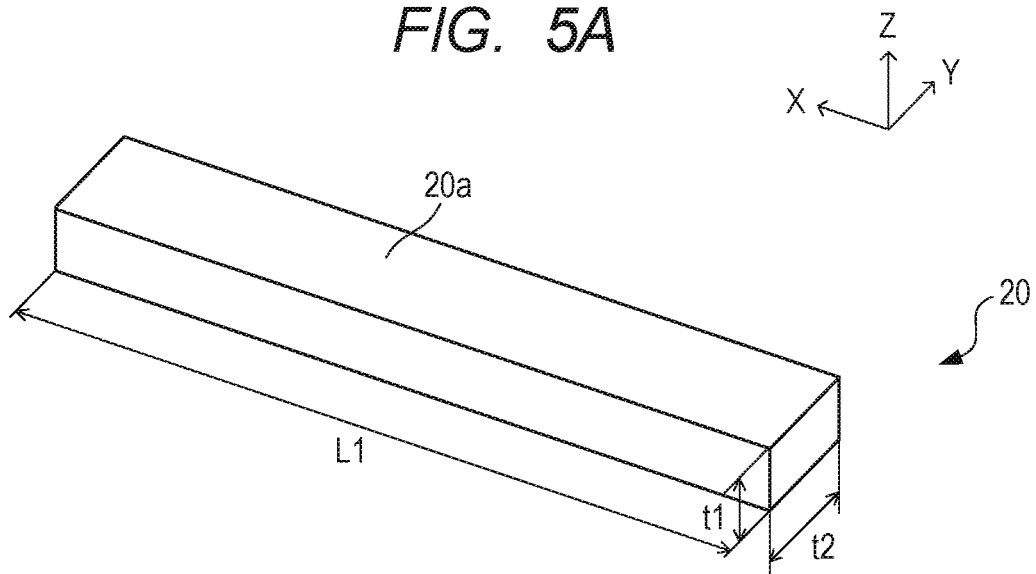
FIG. 5A is a perspective view of a friction member 20 in a conventional example.

FIG. 5A is a perspective view of a quadrangular prism-shaped friction member 20 in a conventional example. The friction member 20 includes a frictional contact surface 20a with which projection portions 101b-1 and 101b-2 of a vibration plate 101 are brought into contact. The friction member 20 includes dimensions of a length L1 in the X-axis direction and a thickness t1 in the Z-axis direction. The length L1 is determined according to an amount of movement of the vibration wave motor 100. In other words, if a certain amount of movement is required, the friction member 20 needs to have a shape elongated in the X-axis direction, which is a direction of movement.

In order to make the vibration wave motor 100 thinner, simple reduction in thickness t1 of the friction member 20 results in decrease in bending strength in the X-axis direction of the friction member 20, which causes a resonant mode of the friction member 20 to be shifted to the low-frequency side. Then, frequency intervals between respective vibration resonance points become narrow, resulting in the resonant mode interfering with a drive frequency range. If a vibration resonance point of the friction member 20 exists in the drive frequency range for the vibration wave motor 100, the state of frictional contact between the vibrator 103 and the friction member 20 deteriorates. In that case, a desired driving speed cannot be achieved, resulting in deterioration in driving characteristic and controllability of the vibration wave motor 100.

Figure 5B:
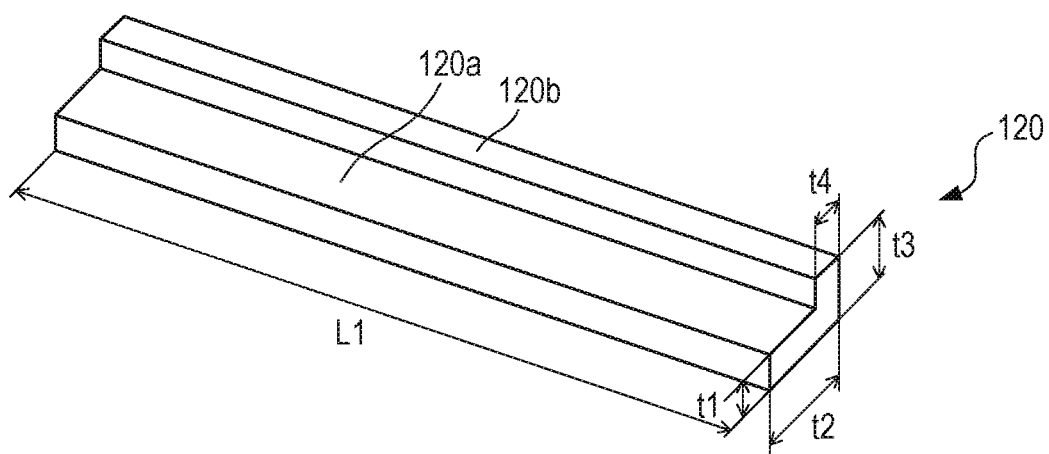
FIG. 5B is a perspective view of a friction member 120 in Exemplary Embodiment 1.

FIG. 5B is a perspective view of the friction member 120 in Exemplary Embodiment 1 of the present invention. The friction member 120 further includes reinforcing portion 120b in addition to the frictional contact surface 120a. The reinforcing portion 120b serves to increase a bending strength in the X-axis direction (longitudinal direction) of the friction member 120. In determining a strength of the friction member 120, it is necessary to determine respective dimensions t1, t2, t3 and t4 of the friction member 120 so that no vibration resonance point of the friction member 120 exists in a range of driving frequencies to be used in the vibration wave motor 100. In other words, there are multiple vibration resonance points of the friction member 120 in various resonant modes and orders, and thus it is necessary to determine the respective dimensions so as to ensure a bending strength of the friction member 120 and also expand intervals of frequencies of the respective vibration resonance points. Then, it is necessary to set the driving frequency range for the vibration wave motor 100 within any of the frequency intervals.

In the present invention, the provision of the reinforcing portion 120b in the friction member 120 prevents decrease in bending strength of the friction member 120 even if the thickness t1 is reduced, and thus, sufficient frequency intervals between the respective vibration resonance points can be kept. Here, the reinforcing portion 120b is provided so as to be positioned in area A surrounded by the dashed line in FIG. 1. Area A is an area between the flat plate portion 101a of the vibration plate 101 and the frictional contact surface 120a. In the vibration wave motor 100 including the projection portions in the vibrator 103 according to Exemplary Embodiment 1 of the present invention, area A is a space portion (dead space). Since the reinforcing portion 120b is provided in area A, which is a dead space, the dimension t1 in the Z-axis direction of the friction member 120 can be reduced, and as a result, the vibration wave motor 100 can be thinned.

As described above, it is necessary to determine the respective dimensions of the friction member 120 taking note of the bending strength of the friction member 120 and the frequency intervals between the respective vibration resonance points. In the quadrangular prism shape in the conventional example illustrated in FIG. 5A, there is only a degree of freedom that allows designing of dimensions t1, t2 and L1 in designing the friction member 20. However, in the friction member 120 illustrated in FIG. 5B, the respective dimensions t1, t2, t3, t4 and L1 can be designed, and thus the degree of freedom in design is enhanced compared to that of the quadrangular prism shape in the conventional example.

Sites in which a driving force of the vibration plate 101 is generated are only parts in which the projection portions 101b-1 and 101b-2 are in contact with the frictional contact surface 120a, and a driving load is generated if the vibration plate 101 and the friction member 120 are in contact with each other in a part other than those parts. Therefore, it is necessary that the reinforcing portion 120b be provided in area A to avoid contact with the vibration plate 101.

With the above-described configuration, the vibration wave motor 100 according to Exemplary Embodiment 1 of the present invention can be thinned without degradation in driving performance. Although a linear-type vibration wave motor has been described as an example, the present invention is applicable to a rotary-type vibration wave motor.

Exemplary Embodiment 2

Figure 6:
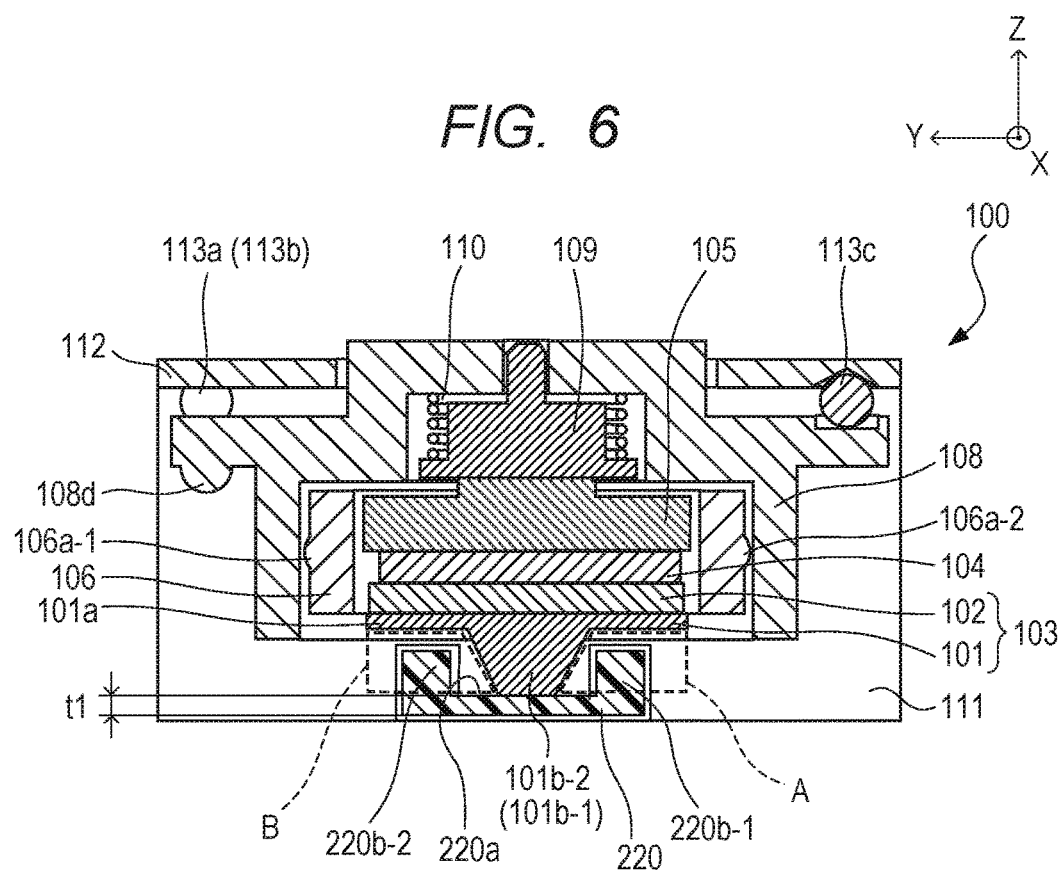
FIG. 6 is a cross-sectional view of a major part of a vibration wave motor 100 according to Exemplary Embodiment 2.

FIG. 6 is a cross-sectional view of a major portion of a vibration wave motor 100 according to Exemplary Embodiment 2. A friction member 220 in Exemplary Embodiment 2, which is made to be even thinner than the friction member 120 in Exemplary Embodiment 1, includes two reinforcing portions 220b-1 and 220b-2. The reinforcing portions 220b-1 and 220b-2 are provided in area A and area B between a flat plate portion 101a of a vibration plate 101 and a frictional contact surface 220a. In other words, the reinforcing portions 220b-1 and 220b-2 are provided on opposite sides of the projection portions 101b-1 and 101b-2. Here, each of area A and area B is a space portion (dead space) as in Exemplary Embodiment 1. Also, as in Exemplary Embodiment 1, each dimension of the friction member 220 is determined in consideration of a relationship between a bending strength of the friction member 220 and vibration resonance points.

The provision of the two reinforcing portions 220b-1 and 220b-2 in Exemplary Embodiment 2 enables enhancement in bending strength of the friction member 220 relative to Exemplary Embodiment 1. Furthermore, each of area A and area B is a dead space that is similar to that of Exemplary Embodiment 1, and use of the dead spaces enables provision of the effect of being able to reduce the dimension t1 of the friction member 220. As a result, the vibration wave motor 100 can further be thinned.

(Modification)

Figure 7:
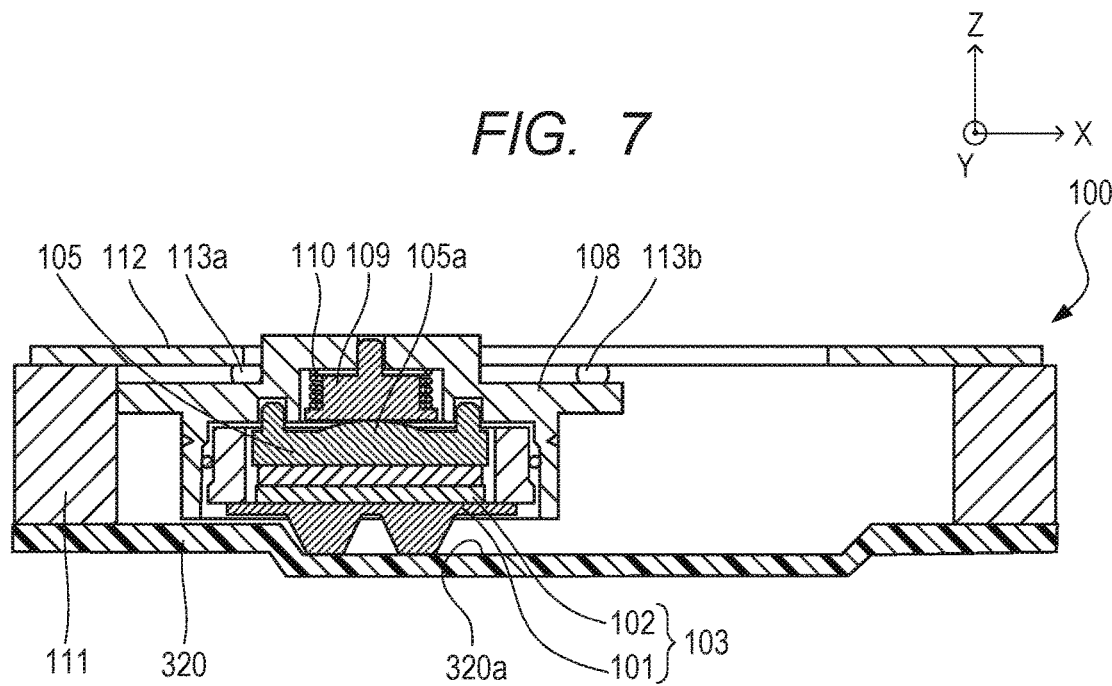
FIG. 7 is a diagram illustrating a modification.

In FIG. 2, when the vibrator 103 is driven to a driving end at a left end, there is a space portion (dead space) between the frictional contact surface 120a and the flat plate portion 101a. Likewise, when the vibrator 103 is driven to a right end, there is a dead space. FIG. 7 illustrates an example in which the friction member 120 is deformed utilizing the dead spaces at the driving ends to make the friction member 120 thinner (smaller). Reference numeral 320 denotes a deformed friction member. A friction member 320 deformed by provision of a part of the friction member 320 in the vicinity of each of respective driving end portions at the left and right ends is thinned. The friction member 320 enables further thinning of the vibration wave motor 100.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-080688, filed Apr. 10, 2015, which is hereby incorporated by reference herein in its entirety.

What is claimed is:

1. A vibration wave motor comprising:
a vibrator including a piezoelectric element and a vibration plate; and
a friction member including a frictional contact surface to be brought into contact with the vibrator, the vibrator and the friction member being moved relative to each other using vibration generated in the vibrator,
wherein the vibration plate includes a flat plate portion to which the piezoelectric element is fixed and a projection portion to be brought into contact with the friction member, the friction member including at least one reinforcing portion that increases a strength of the friction member along a direction of the relative movement, in a region between the flat plate portion and the friction member,
wherein the reinforcing portion does not come into contact with the projection portion.

2. The vibration wave motor according to claim 1, wherein the reinforcing portion at least increases a strength in a longitudinal direction of the friction member.

3. The vibration wave motor according to claim 1, wherein the reinforcing portion is provided in each of opposite sides of the projection portion.

4. The vibration wave motor according to claim 1, wherein each dimension of the friction member is determined in consideration of a vibration resonance point of the friction member.

5. The vibration wave motor according to claim 1, wherein DLC coating is formed on the frictional contact surface.

6. The vibration wave motor according to claim 1, wherein the reinforcing portion includes a resin material.

7. The vibration wave motor according to claim 1, wherein at a driving end portion to which the vibrator makes the relative movement, a part of the friction member is provided in a region between the flat plate portion and the frictional contact surface, the part of the friction member being the reinforcing portion.

8. The vibration wave motor according to claim 1, wherein a plurality of the projection portions is provided, the reinforcing portion not coming into contact with all of the projection portions.

9. The vibration wave motor according to claim 1, wherein the vibration wave motor is an ultrasonic motor in which the vibration is ultrasonic vibration.

10. The vibration wave motor according to claim 1, further comprising a pressurizing means that presses the vibrator against the friction member.

11. The vibration wave motor according to claim 1, wherein the reinforcing portion is provided in one side of the projection portion.

* * * * *